(12) United States Patent
Wilms

(10) Patent No.: US 8,408,639 B2
(45) Date of Patent: Apr. 2, 2013

(54) VEHICLE SEAT

(75) Inventor: Michael Wilms, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 403 days.

(21) Appl. No.: 12/256,151

(22) Filed: Oct. 22, 2008

(65) Prior Publication Data

US 2009/0243347 A1 Oct. 1, 2009

Related U.S. Application Data

(60) Provisional application No. 61/040,837, filed on Mar. 31, 2008.

(51) Int. Cl.
*B60N 2/48* (2006.01)
*B60N 2/66* (2006.01)
*A47C 1/02* (2006.01)
*A47C 7/46* (2006.01)

(52) U.S. Cl. ........ 297/61; 297/408; 297/410; 297/284.4

(58) Field of Classification Search .................... 297/61, 297/284.4, 410, 408, 409
See application file for complete search history.

(56) References Cited

U.S. PATENT DOCUMENTS

| | | | |
|---|---|---|---|
| 3,762,769 A * | 10/1973 | Poschl | 297/284.4 |
| 3,929,374 A | 12/1975 | Hogan et al. | |
| 4,204,255 A | 5/1980 | Cremer | |
| 5,505,520 A * | 4/1996 | Frusti et al. | 297/284.4 |
| 5,580,124 A | 12/1996 | Dellanno | |
| 5,823,619 A * | 10/1998 | Heilig et al. | 297/216.12 |
| 5,826,937 A | 10/1998 | Massara | |
| 5,848,661 A * | 12/1998 | Fu | 180/273 |
| 5,884,968 A | 3/1999 | Massara | |
| 6,213,549 B1 | 4/2001 | Wieclawski | |
| 6,273,511 B1 | 8/2001 | Wieclawski | |
| 6,416,125 B1 * | 7/2002 | Shah et al. | 297/216.12 |
| 6,478,373 B1 | 11/2002 | Hake et al. | |
| 7,159,934 B2 | 1/2007 | Farquhar et al. | |
| 7,185,950 B2 | 3/2007 | Pettersson et al. | |
| 2006/0006721 A1 | 1/2006 | Ogawa et al. | |
| 2006/0061169 A1 * | 3/2006 | Kohl et al. | 297/284.4 |
| 2006/0170258 A1 | 8/2006 | Ishizuka | |
| 2006/0273636 A1 * | 12/2006 | Sugimoto | 297/216.12 |

FOREIGN PATENT DOCUMENTS

WO WO 8703256 A1 * 6/1987

* cited by examiner

*Primary Examiner* — David Dunn
*Assistant Examiner* — Tania Abraham
(74) *Attorney, Agent, or Firm* — Mark E. Duell; Rankin Hill & Clark LLP

(57) ABSTRACT

A vehicle seat and head restraint assembly is disclosed in which the configuration of the seat back is automatically adjusted as the position of the head rest is changed. Upon lowering the head restraint, a forwardly directed face of the seat back is urged outward to thereby decrease a torso angle associate with the seat assembly. Additional versions are described in which the torso angle is decreased by raising the head rest. And, versions are described in which horizontal or pivotal movement of the head restraint causes movement of a forward face of the seat back.

18 Claims, 8 Drawing Sheets

VEHICLE SEAT

CROSS-REFERENCE TO RELATED APPLICATIONS

This application claims priority upon U.S. provisional application Ser. No. 61/040,837 filed Mar. 31, 2008.

BACKGROUND OF THE INVENTION

The presently disclosed embodiments are directed to the field of vehicle seats, and particularly such seats having head rests. The embodiments relate to adjusting the contour of the seat back to promote comfort and safety of the user.

Adjustable vehicle seats and positionable head restraints or head rests are well known in the art. For example, systems are known for adjusting seat position based upon the individual and driving conditions. Such systems provide for automatic adjustment of the seat back, among other parameters.

It is also well known to design vehicle seats and head rests to improve protection to occupants from rear end collisions and whiplash. Various patents are known which are directed to vehicle seats having configurations that include a cranium support portion and a cervical spine support portion. Certain patents describe the incorporation of various crush zones in the form of air bladders in the seat back.

Segmented seat backs with head rests in which the upper portion of the seat back and head rest are adjustable are also known. Seat backs are known having a bottom portion and a top portion, with a head rest attached to the top portion. The top portion and head rest can be pivoted toward the individual's head to purportedly minimize injuries from a rear end collision that might otherwise result. Seat backs are also known that include an upper portion having a head rest and a lower portion. The seat back upper and lower portions can be pivoted with respect to each other, thereby also changing the position of the head rest. Biasing the upper portion of the seat back and the attached head rest towards a forward position supports and contacts a person. Seat backs have also been provided with a joint so that an upper part of the seat (and head rest attached thereto) can be inclined relative to the lower part of the seat. Inclination of the upper part is adjusted based upon the inclination of the lower part.

Vehicle seats with adjustable seat back contours, particularly in the upper back and neck region and head area are also known. Pneumatic energy absorbing seat assemblies are known in which the contour of the seat assembly can be adjusted by inflating various lumbar and thoracic bladders in the seat. An integrated head restraint system that features a damping mechanism in such seats is also known. In such seats, a head restraint member is adjustable forwardly and rearwardly by inflating and deflating the thoracic bladder.

In addition, it is also known to provide communication between a head rest and a seat back. A seat back and head rest system is known in which when the seat back is in a generally upright position, the head rest is back and out of the way of a passenger's head. When the seat is moved to a recline position, the head rest is rotated forward to support the head. A seat back and head restraint system is also known that adjusts the position of the head restraint depending upon the degree of recline of the seat back.

More recently, designs have focused on changing the position of a head rest and the configuration of a seat back upon a rear end collision. A seat mechanism that couples a lumbar support to a head rest is known. The mechanism apparently disengages the lumbar support from the seat back frame in the event of a rear end collision. Force is transmitted to the head rest to move the head rest forward in closer proximity to the occupant. In addition, a seat and head rest assembly is known having a seat back upper portion push-out device. Upon application of a force such as from a rear end collision, to the front of a seat, a lever is displaced which in turn urges a pushing member forward, toward the shoulder region of the seat occupant. The movement of the lever also results in forward movement of the head rest.

In summary, vehicle seats with adjustment provisions are well known in the art. And, designing vehicle seats with improved safety features has long been a concern for artisans. In addition, numerous seat, head rest, and seat back configurations have been developed that enable a user to adjust the relative positions of the seat, head rest, and seat back contour.

As efforts to improve occupant comfort continue, vehicle seats have been provided with an increasing array of adjustments. In addition, it is typical for many or all of these adjustments to be powered, or made automatically by the vehicle upon sensing or otherwise determining the identity of the seat occupant. However, many of these adjustments are interrelated, such that adjustment of one parameter affects other parameters.

Safety concerns may dictate that head rests be positioned at specific locations relative to the head of a seat occupant. For example, new legislation set forth in 49 CFR Part 571, and specifically 49 CFR Section 571.202, will likely require front and rear head rests in vehicles to be directly proximate to the back of an occupant's head. Requiring a particular position for a head rest will likely result in an increased user preference that the seat back be adjusted to accommodate the dictated position of the head rest. This concern may be aggravated when a seat is used by different people, and so, the dictated position of the head rest may change from user to user. Although manual adjustment of a seat back is possible and known in the art, it would be beneficial to provide a vehicle seat in which the configuration of the seat back was automatically adjusted based upon the position of the head rest.

The provision of a head rest that is relatively tall and thick, may serve to improve user comfort. Utilizing a taller head rest, generally increases the range of user heights that may be accommodated by the seat and head rest assembly. However, as the head rest is raised to accommodate a tall person, the previous configuration of the seat back will typically not match the shape of the back of the tall occupant, since the user's shoulders are higher, and the user's lower back region will be higher than that of the previous seat occupant. And so, the provision of a thicker head rest may promote user comfort by providing support for a tall user's elevated neck and shoulder regions. However, the use of a tall and thick head rest may be undesirable because such head rests may interfere with folding of the seat, such as in clam-shell configurations where seat backs are designed to fold flat. In additions, a bulky head rest, i.e. being relatively tall and thick, may interfere with designs in which the seat back can be stowed away.

Although satisfactory in many respects, the prior art does not provide a seat configuration in which the contour of a seat back is automatically adjusted based upon changes in the position of a head rest. That is, although it is known to change the position of a head rest based upon changes in the position of the seat or seat back, the prior art does not provide a vehicle seat configuration in which the position or contour of a seat back is changed based upon the position of the head rest. Specifically, it would be desirable to provide a vehicle seat having provisions that adjust the contour of the seat back based upon a change in the position of the head rest, and particularly, upon a change in height of the head rest.

Providing a seat and head rest assembly that could be particularly tailored to match the physical size of the seat occupant should improve comfort for the user, facilitate safety objectives, and enable the use of space saving head rests to thereby enable the seat assembly to be easily stowed or otherwise placed in a variety of folded or reclined states.

SUMMARY OF THE INVENTION

The difficulties and drawbacks associated with previous-type systems are overcome in the present method and apparatus for a seat assembly having a seat back that adjusts or otherwise changes its configuration based upon the position or changes in the position of a head rest.

In the first aspect, the present invention provides a vehicle seat assembly comprising a seat and a seat back positionably secured to the seat. The seat back has a seat face defining a contour adapted to contact and support the back of a person sitting in the seat assembly. The seat assembly also comprises a head restraint positionably secured to the seat back. Upon a change in the position of the head restraint, the contour of the seat face of the seat back changes.

In another aspect, the present invention provides a vehicle seat assembly comprising a seat and a seat back positionably secured to the seat. The seat back defines a seat face adapted to contact and support the back of a person sitting in the seat assembly. The seat assembly also comprises a head restraint positionably secured to the seat back. Upon changing the height of the head restraint, a contour of the seat face of the seat back changes.

In yet another aspect, the present invention provides a vehicle seat assembly comprising a seat adapted to contact and support an occupant sitting in the seat assembly. The seat assembly also comprises a hinge component affixed to the seat. The seat assembly also comprises a seat back pivotally secured to the seat by the hinge component. The seat back includes a forwardly directed seat face adapted for contacting and supporting the back of the seat occupant. The seat face is displaceable between an outwardly extended position and an inwardly retracted position. The seat assembly also comprises a selectively positionable head restraint secured to the seat back. The head restraint is positionable between a raised position and a lowered position. Upon the head restraint being repositioned, the seat face is displaced.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

The present invention provides a vehicle seat back and head restraint system in which displacement of the head restraint imparts a change in the shape or configuration of the seat back. Preferably, when the head restraint is in a raised position, the seat back will exhibit a first shape or configuration that is designed to accommodate the back of a person. Upon lowering the head restraint, the shape of the seat back changes, and preferably, is displaced outward in a second shape or configuration that is designed to accommodate the back of the person in that alternate position. Thus, when the head restraint is lowered to a "down" position, a torso angle of that person is moved forward. Therefore, the configuration of the seat back changes depending upon the position, and particularly, the height of the head restraint.

The present invention is particularly directed to vehicular seats and seating assemblies. Seats utilized in vehicles such as automobiles, light trucks, sport utility vehicles, and vans for example, must meet demanding safety requirements. In addition, reducing weight while maintaining sufficient structural rigidity and strength for such seats introduces an entirely different set of design considerations than those associated with residential chairs and the like.

In describing the details and preferred embodiments of the present invention, it is instructive to consider various terms referred to herein. The term "head rest" or "head restraint" as used herein refers to a device designed to limit the rearward displacement of an adult occupant's head in relation to the torso in order to reduce the risk of injury to the neck in the event of a rear impact. The present invention is primarily directed to an adjustable head rest, which is capable of being positioned to fit the morphology of the seated occupant. The device may permit horizontal adjustment of the head restraint, pivotal adjustment of the head restraint, and/or vertical displacement of the head restraint. The present invention is also directed to an integral head restraint, in which the head restraint is generally integral with the seat back, however, some degree of adjustable positioning of the head restraint is possible.

"H point" is defined by SAE J826, and is generally the hip pivot point of a person sitting in the seat of interest.

"Torso angle" is the angle of a plane intersecting the H point, generally extending through the torso of a person sitting in the seat of interest, taken with respect to a vertical plane.

"Back set" is the minimum horizontal distance between the rear of a representative head of a seated 50$^{th}$ percentile male occupant and the frontwardly directed surface of the head restraint.

"Contour" as used herein refers to the shape or configuration of a frontwardly directed face of a seat back. The contour of a seat back is preferably shaped to accommodate, i.e. receive and support, the back of an individual sitting in the seat.

Figure 1:
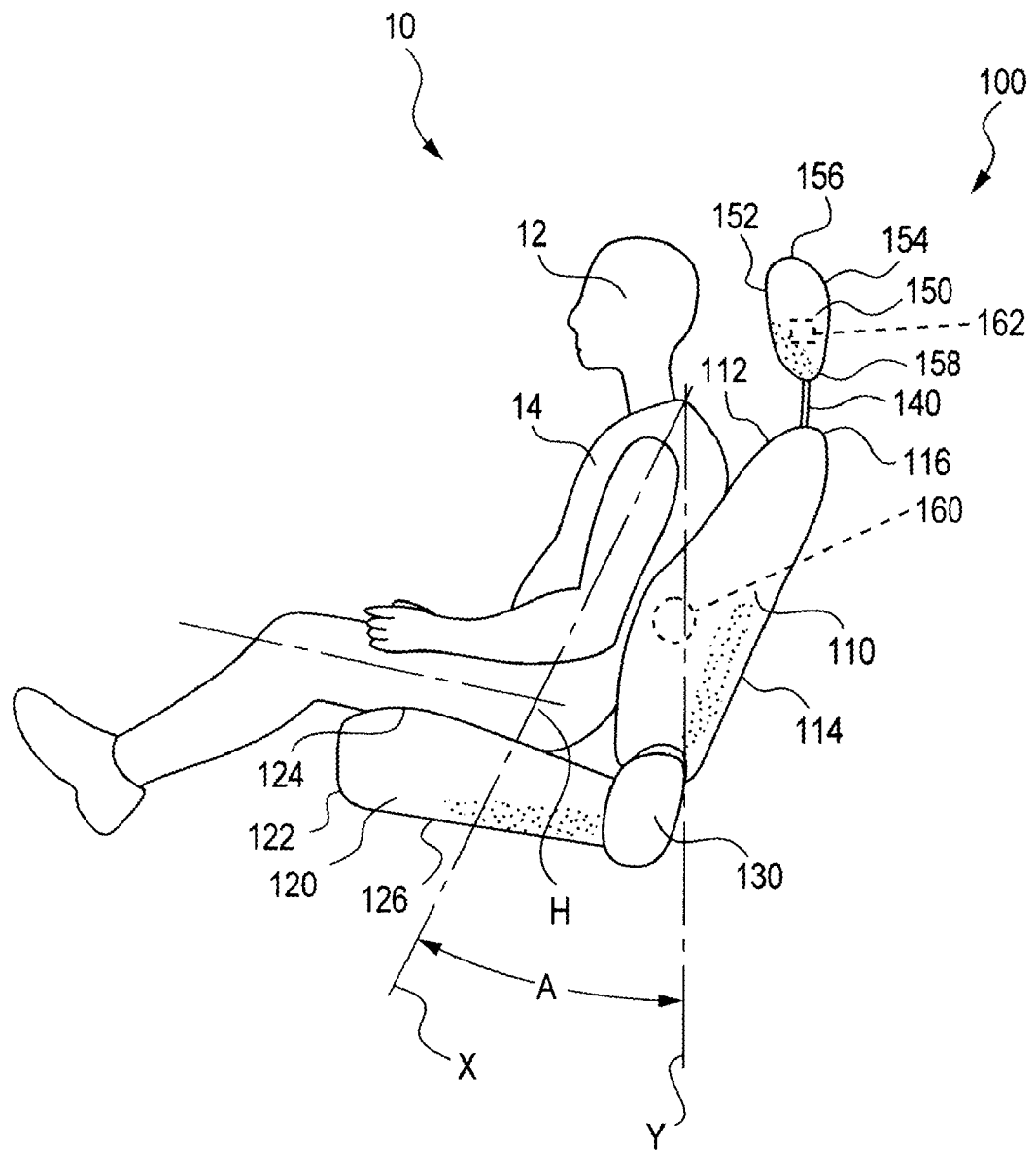
FIG. 1 is a schematic illustration showing a seat and head restraint assembly and an occupant seated in the seat assembly, along with various planes, a torso angle associated with the occupant while in the seat, and a reference point described herein.

FIG. 1 is a schematic illustration showing a seat and head restraint assembly 100 and an occupant 10 seated in the seat assembly, along with various planes that define a torso angle, and a reference point used herein. Specifically, the seat and head restraint assembly 100 comprises a seat back 110, positionably attached to a seat 120 by a hinge member 130. The assembly 100 also comprises a head restraint 150 selectively positionable and secured to the seat back 110 by one or more support members 140. The seat back 110 includes a forwardly directed face 112, an oppositely directed, rearward face 114, and an upper face 116 generally extending between the two faces 112 and 114. The seat 120 includes an upwardly directed surface 124, an oppositely directed underside 126, and a front face 122 generally extending therebetween. The head restraint 150 includes a forward face 152, an oppositely directed rear face 154, an upper face 156, and a lower face 158. The occupant 10 includes a head 12 and a torso 14. As will be seen in FIG. 1, the rear portion of the torso 14 is supported by the forwardly directed face 112 of the seat back 110.

FIG. 1 also illustrates several parameters that are referenced herein. The H point, is depicted as point H, which is generally the hip pivot point of a person sitting in the seat of interest. The torso angle is shown as angle A, which is the angle of a torso plane x intersecting the H point, generally extending through the torso 14 of a person 10 sitting in the seat assembly 100, taken with respect to a vertical plane y.

Figure 2:
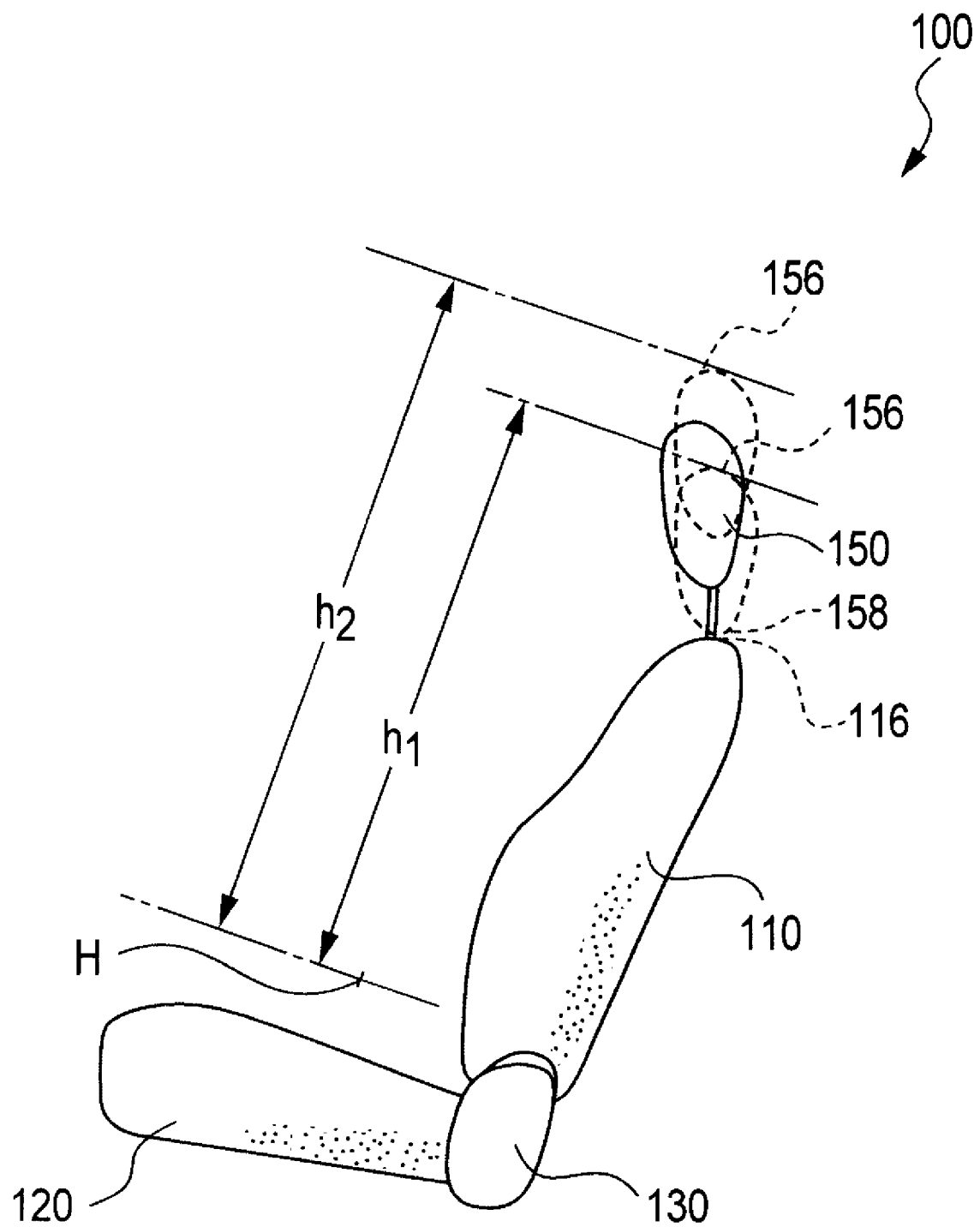
FIG. 2 is a schematic illustration showing the seat and head restraint assembly depicted in FIG. 1, along with additional dimensions referenced herein.

FIG. 2 is a schematic illustration showing the seat and head restraint assembly 100 depicted in FIG. 1, along with additional dimensions referenced herein. Typically, head restraints are adjustable between some minimum head restraint height and some maximum head restraint height. Specifically, FIG. 2 illustrates a minimum head restraint height $h_1$ and a maximum head restraint height $h_2$. The head restraint height is measured along a line parallel to the torso plane x, shown in FIG. 1 which determines the torso angle. The head restraint height is the distance from the H point, to the top surface of the head restraint, typically within the upper face 156 of the head restraint 150. Generally, vehicle seat assemblies to which the present invention is directed, exhibit a head restraint height that is adjustable from about 700 to about 1100 mm, more preferably from about 750 to about 1000 mm, and more preferably from about 800 to about 1000 mm. It is also contemplated that for front vehicle seats, the minimum head restraint height $h_1$ should be at least 800 mm. In certain applications, it is preferred that the head restraint height should not be adjustable below 750 mm. For rear vehicle seats, the minimum head restraint height $h_1$ should be at least 750 mm. However, it will be appreciated that the present invention can be utilized in seat assemblies having head restraint heights greater than or lesser than these values.

Figure 3:
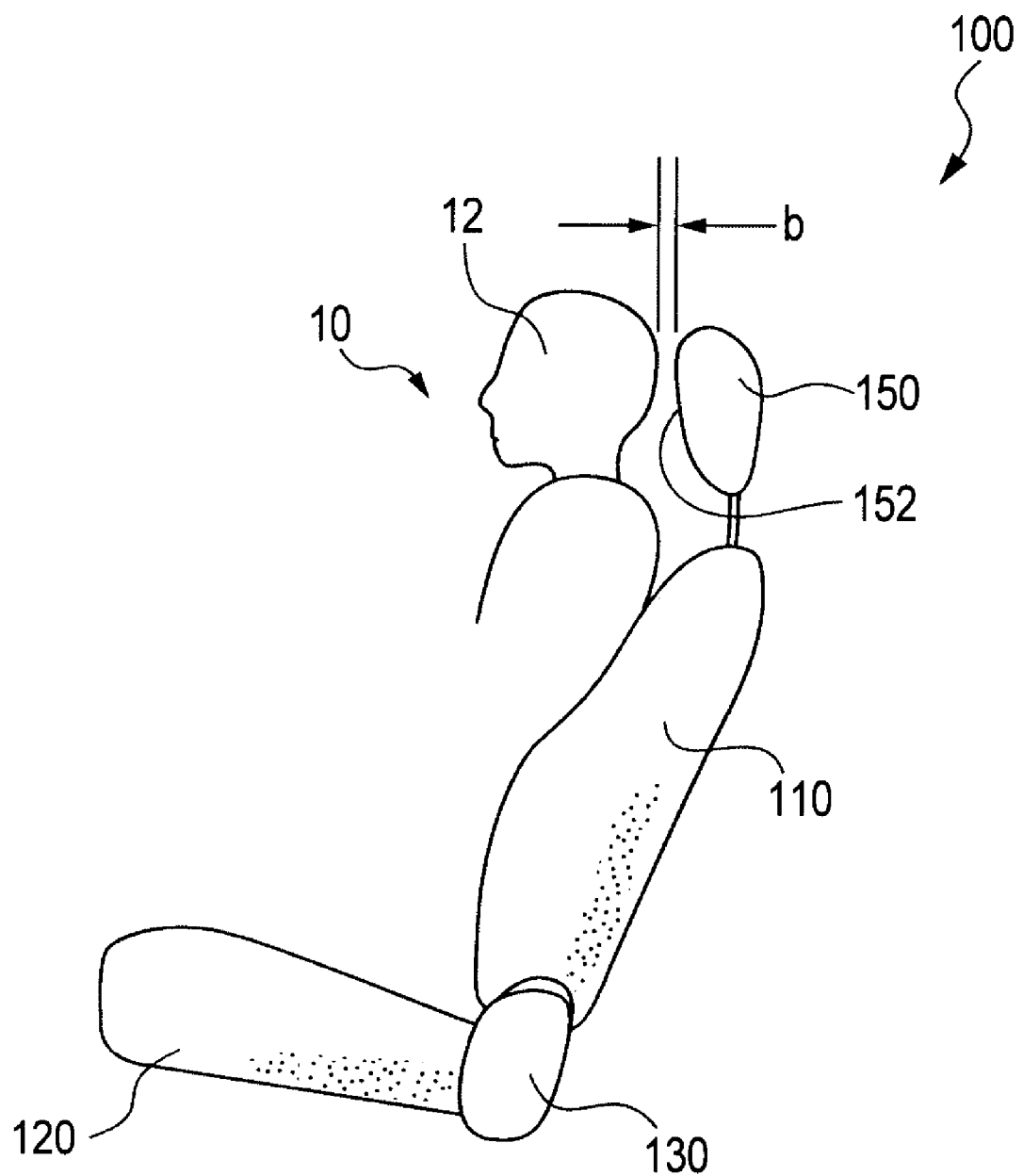
FIG. 3 is a schematic illustration showing the seat and head restraint assembly depicted in FIG. 1 and a head and shoulder portion of an occupant seated in the seat assembly, along with an additional dimension referenced herein.

FIG. 3 is a schematic illustration showing the seat and head restraint assembly 100 depicted in FIG. 1 and a head 12 and shoulder portion of an occupant 10 seated in the seat assembly 100, along with an additional dimension referred to as a back set b. The back set is the maximum horizontal distance between the rear of a representative head of a seated 50$^{th}$ percentile male occupant, illustrated as head 12, and the frontwardly directed surface 152 of the head restraint 150. Preferably, the present invention is directed to seat assemblies in which the seat assembly provides a back set less than 100 mm, more preferably less than 75 mm, more preferably less than 55 mm, and most preferably less than 50 mm. However, it will be appreciated that the present invention can be embodied in seat assemblies having back sets greater than these values.

Figure 4:
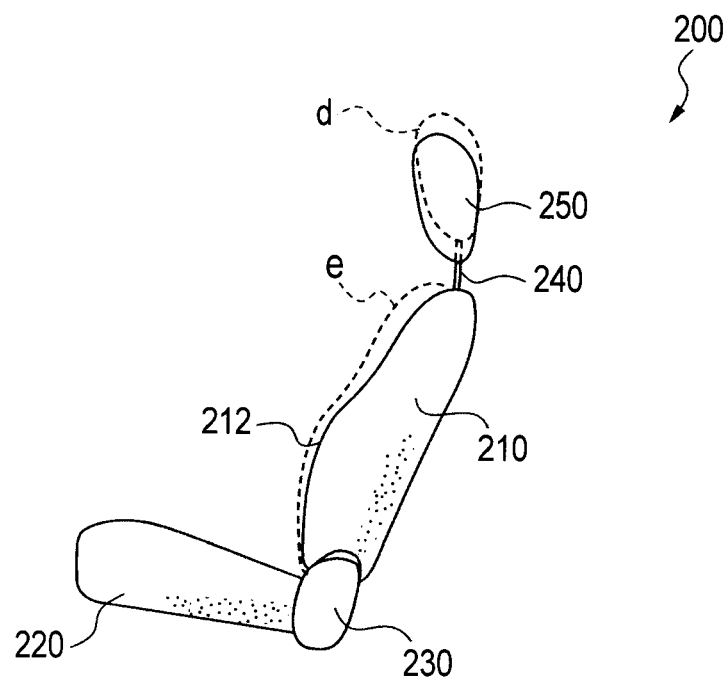
FIG. 4 is a schematic illustration of a preferred embodiment seat and head restraint assembly in accordance with the present invention.
Figure 5:
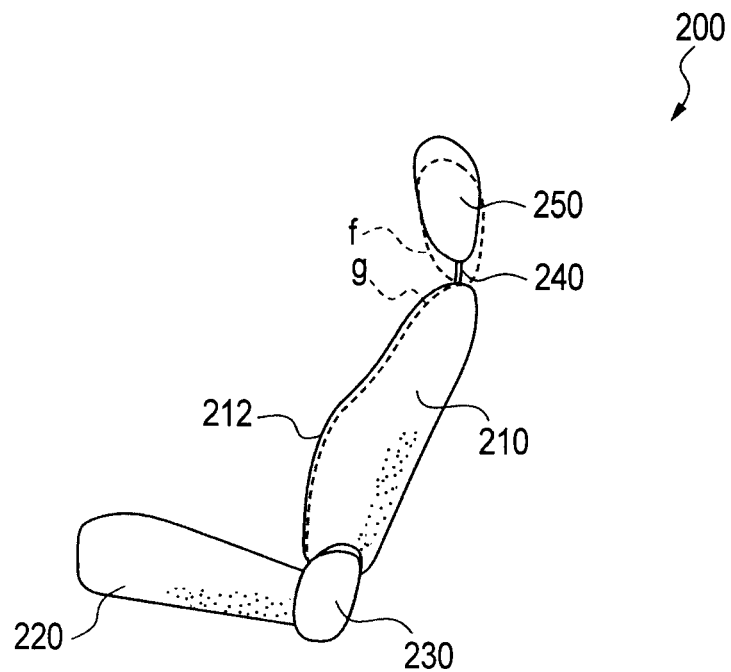
FIG. 5 is another schematic illustration of the preferred embodiment seat and head restraint assembly shown in FIG. 4.

FIGS. 4 and 5 are schematic illustrations of a preferred embodiment seat and head restraint assembly 200 in accordance with the present invention. The assembly 200 comprises a seat back 210 positionably secured to a seat 220 by use of a hinge member 230. The seat back 210 includes a seat front face 212. The assembly 200 also comprises a selectively positionable head restraint 250 secured to the seat back 210 by one or more supports 240. The head restraint 250 can be positioned between an upper or raised position such as shown in FIG. 4, to a lower or lowered position, such as shown in FIG. 5. The upper position is depicted in FIG. 4 as dashed position d. And, the lower position is depicted in FIG. 5 as dashed position f. The position of the head restraint 250 shown in both FIGS. 4 and 5 in solid lines, represents a position between the upper position d and the lower position f. It will be understood that the head restraint 250 of the assembly 200 can be moved to a variety of other positions between the upper position d and the lower position f. In accordance with the present invention, in this preferred embodiment, upon raising the head restraint 250 to the raised position d shown in FIG. 4, the front face 212 of the seat back 210 is urged outwardly to a new position, such as shown by the dashed line e. Upon the head restraint 250 being lowered to the position f shown in FIG. 5, the front face 212 of the seat back 210 is urged inwardly toward the rear of the seat back 210, to a new position such as shown by the dashed line g. Thus, it can be seen that raising or lowering the head restraint 250 causes the contour of the seat back 210 to change.

Figure 6:
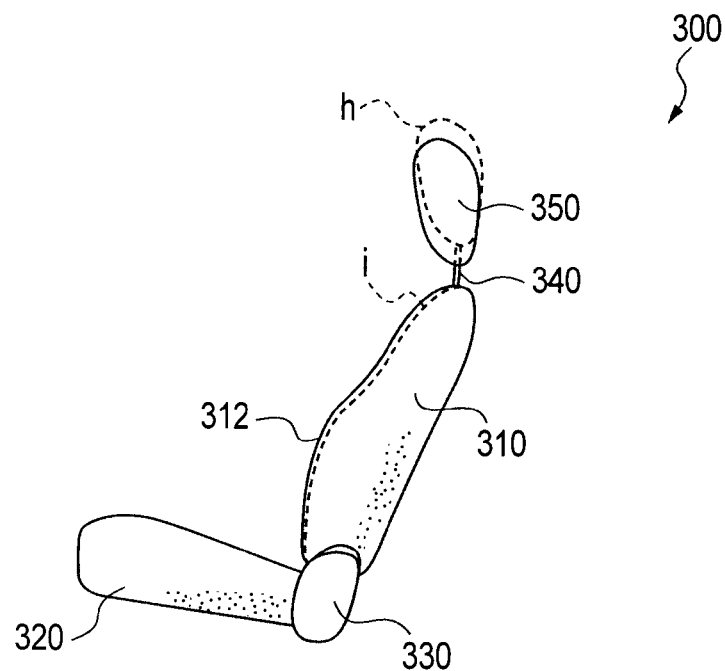
FIG. 6 is a schematic illustration of a preferred embodiment seat and head restraint assembly in accordance with the present invention.
Figure 7:
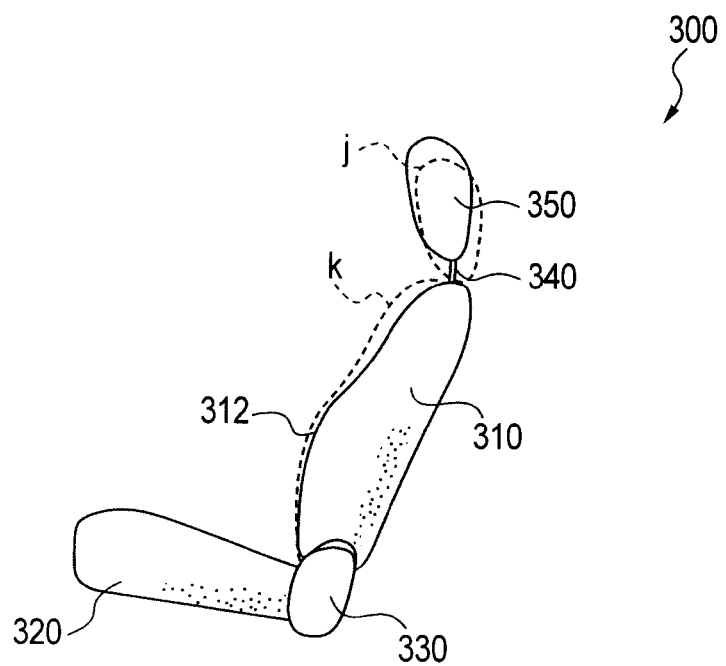
FIG. 7 is another schematic illustration of the preferred embodiment seat and head restraint assembly shown in FIG. 6.

FIGS. 6 and 7 are schematic illustrations of another preferred embodiment seat and head restraint assembly 300 in accordance with the present invention. The assembly 300 comprises a seat back 310 positionably secured to a seat 320 by use of a hinge member 330. The seat back 310 includes a seat front face 312. The assembly 300 also comprises a selectively positionable head restraint 350 secured to the seat back 310 by one or more supports 340. The head restraint 350 can be positioned between an upper position such as shown in FIG. 6, to a lower position, such as shown in FIG. 7. The upper position is depicted in FIG. 6 as dashed position h. And, the lower position is depicted in FIG. 7 as dashed position j. The position of the head restraint 350 shown in both FIGS. 6 and 7 in solid lines, represents a position between the upper position h and the lower position j. As previously described with regard to the embodiment of FIGS. 4 and 5, the head restraint 350 can be positioned in numerous other locations between the upper position h and the lower position j. In accordance with the present invention, in this preferred embodiment, upon raising the head restraint 350 to the raised position h shown in FIG. 6, the front face 312 of the seat back 310 is urged inwardly to a new position, such as shown by the dashed line i. Upon the head restraint 350 being lowered to the position j shown in FIG. 7, the front face 312 of the seat back 310 is urged outwardly past the previous position of the front face of the seat back, to a new position such as shown by the dashed line k. Thus, it can be seen that raising or lowering the head restraint 350 causes the contour of the seat back 310 to change.

Figure 8:
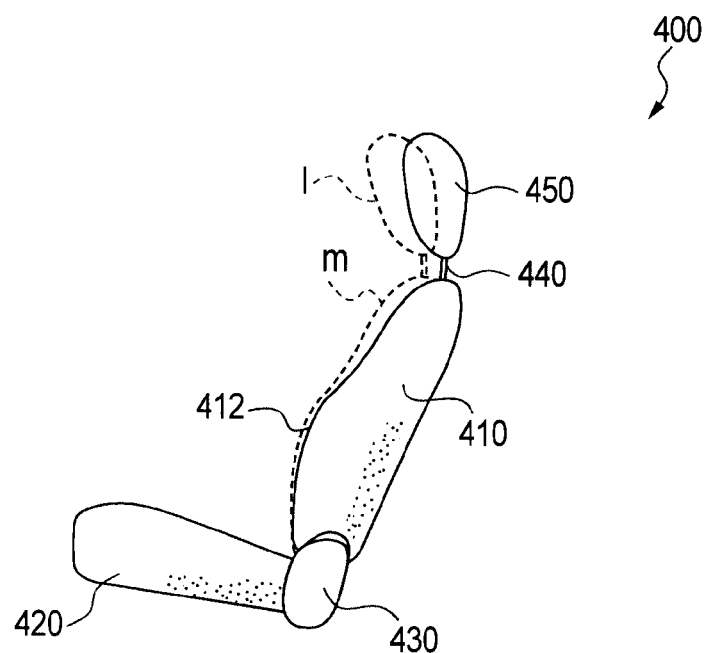
FIG. 8 is a schematic illustration of a preferred embodiment seat and head restraint assembly in accordance with the present invention.
Figure 9:
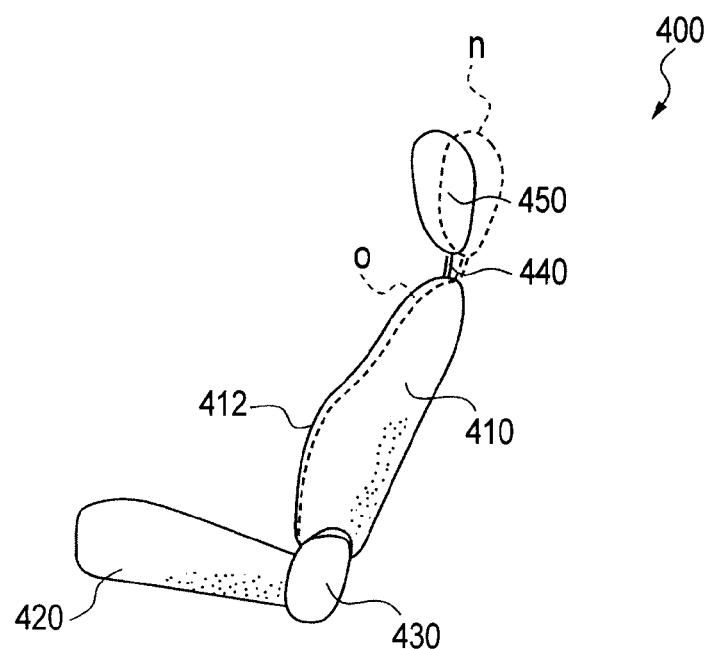
FIG. 9 is another schematic illustration of the preferred embodiment seat and head restraint assembly shown in FIG. 8.

FIGS. 8 and 9 are schematic illustrations of another preferred embodiment seat and head restraint assembly 400 in accordance with the present invention. The assembly 400 comprises a seat back 410 positionably secured to a seat 420 by use of a hinge member 430. The seat back 410 includes a seat front face 412. The assembly 400 also comprises a selectively positionable head restraint 450 secured to the seat back 410 by one or more supports 440. The head restraint 450 can be positioned between a forward position such as shown in FIG. 8, to a rearward position, such as shown in FIG. 9. The forward position is depicted in FIG. 8 as dashed position l. And, the rearward position is depicted in FIG. 9 as dashed position n. The position of the head restraint 450 shown in both FIGS. 8 and 9 in solid lines, represents a position between the forward position l and the rearward position n. It will be understood that the head restraint 450 can be moved to a range of locations between the forward position l and the rearward position n. In accordance with the present invention, in this preferred embodiment, upon forwardly positioning the head restraint 450 to the forward position l shown in FIG. 8, the front face 412 of the seat 410 is urged outwardly to a new position, such as shown by the dashed line m. Upon the head restraint 450 being rearwardly positioned to the position n shown in FIG. 9, the front face 412 of the seat 410 is urged inwardly, to a new position such as shown by the dashed line o. Thus, it will be appreciated that horizontally moving the head restraint 450 causes the contour of the seat back 410 to change.

Figure 10:
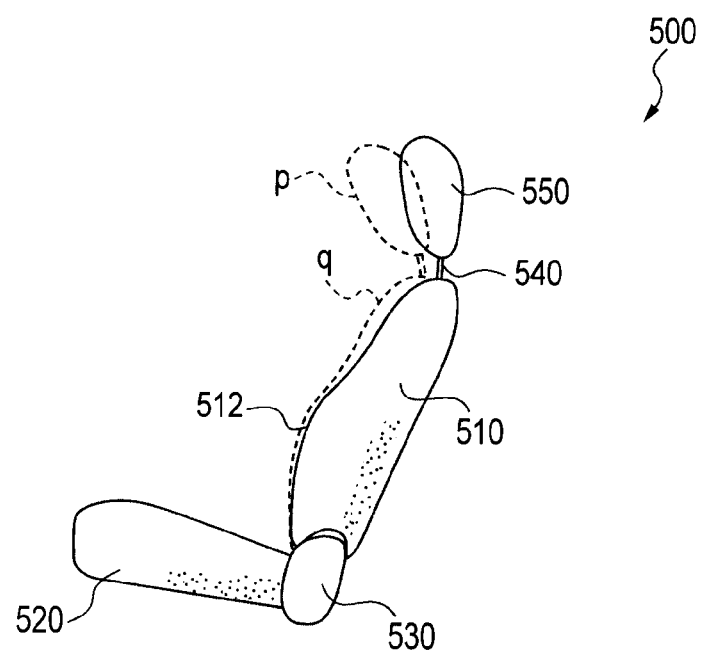
FIG. 10 is a schematic illustration of a preferred embodiment seat and head restraint assembly in accordance with the present invention.
Figure 11:
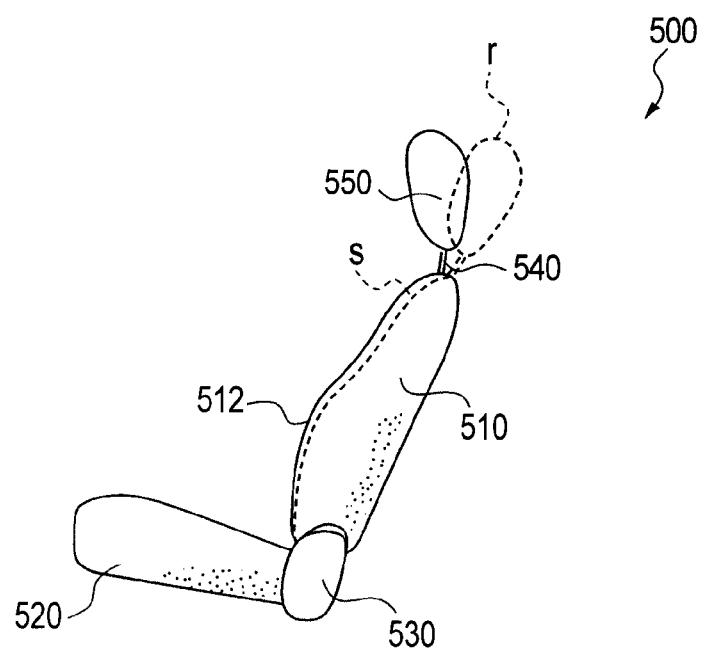
FIG. 11 is another schematic illustration of the preferred embodiment seat and head restraint assembly shown in FIG. 10.

FIGS. 10 and 11 are schematic illustrations of another preferred embodiment seat and head restraint assembly 500 in accordance with the present invention. The assembly 500 comprises a seat back 510 positionably secured to a seat 520 by use of a hinge member 530. The seat back 510 includes a seat front face 512. The assembly 500 also comprises a selectively positionable head restraint 550 secured to the seat back 510 by one or more supports 540. The head restraint 550 can be pivoted between a forward position such as shown in FIG. 10, to a rearward position, such as shown in FIG. 11. The forward position is depicted in FIG. 10 as dashed position p. And, the rearward position is depicted in FIG. 11 as dashed position r. The position of the head restraint 550 shown in both FIGS. 10 and 11 in solid lines, represents a position between the forward position p and the rearward position r. The head restraint 550 can be placed in a variety of other positions between positions p and r. In accordance with the present invention, in this preferred embodiment, upon pivoting the head restraint 550 to the forward position p shown in FIG. 10, the front face 512 of the seat back 510 is urged outwardly to a new position, such as shown by the dashed line q. Upon the head restraint 550 being pivoted to a rearward position r shown in FIG. 11, the front face 512 of the seat 510 is urged inwardly to a new position such as shown by the dashed line s. Thus, it will be understood that pivotally moving the head restraint 550 causes the contour of the seat back 510 to change.

In all of the embodiments described herein, the contour of the seat face of the seat back is generally positionable between an outwardly extended position, an inwardly retracted position, and numerous positions between these extended and retracted positions. It will be understood that preferably, displacement of the seat contour results in a change in the topography or surface geometry of the front face of a seat back. Typically, as the contour changes, portions or regions of the front face may be displaced or otherwise translated outwardly or inwardly relative to the seat back. And, typically, movement of one region may not be to the same extent as movement of another region. For example, for an embodiment in which a seat contour is generally displaced outward, due to raising or lowering of a head restraint; it may be desired for a portion of the front face in a lumber region of the seat back to be displaced outward a distance less than the distance to which another portion of the front face in a thoracic region of the seat back is displaced outward.

Figure 12:
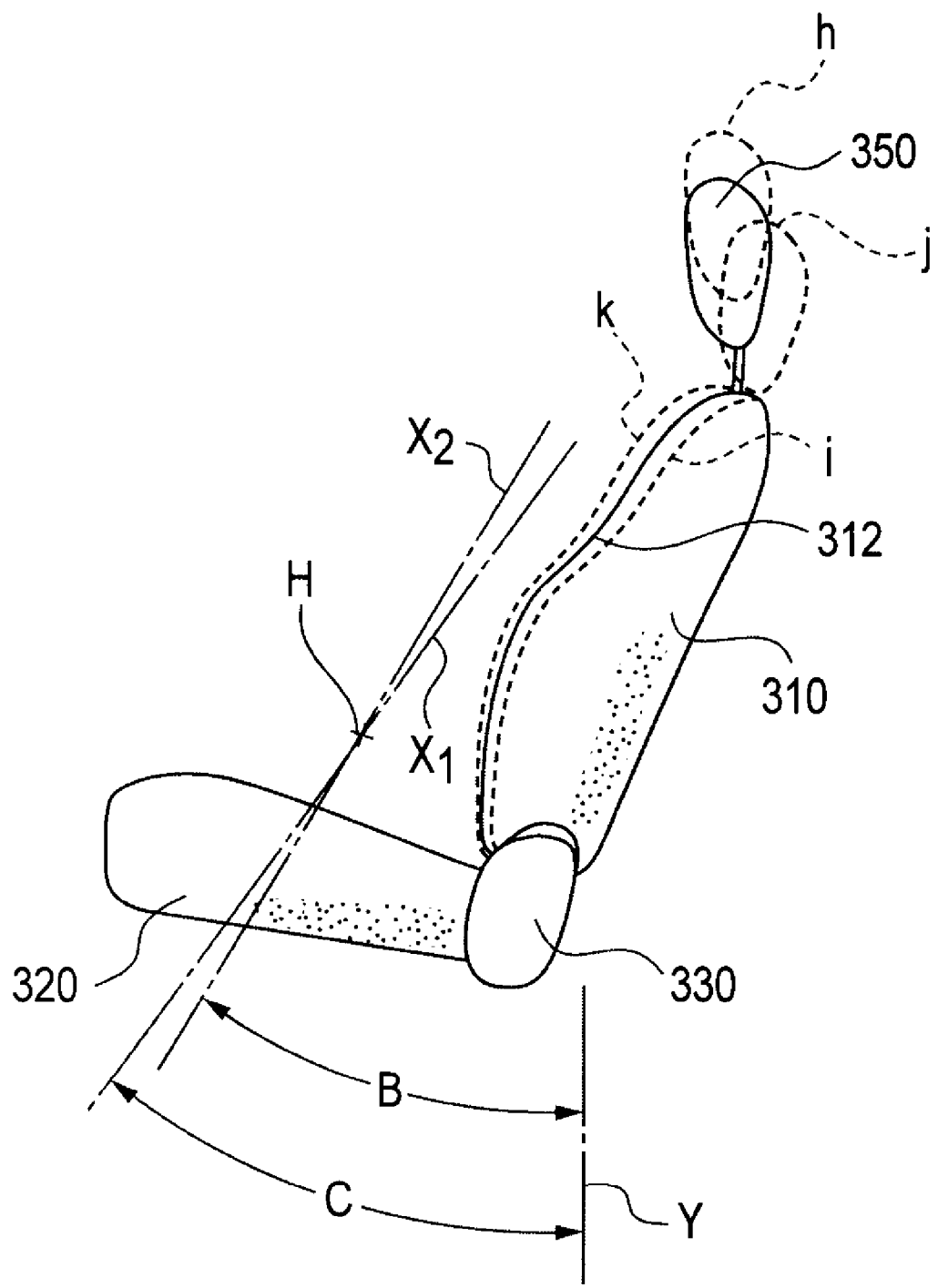
FIG. 12 is a schematic illustration of the preferred seat and head restrain assembly depicted in FIGS. 6 and 7, showing a change in a torso angle in accordance with the present invention.

FIG. 12 is a detailed schematic illustration of the preferred seat and head restraint assembly depicted in FIGS. 6 and 7, showing a change in a torso angle in accordance with the present invention. Specifically, FIG. 12 illustrates a representative change in the torso angle as the head restraint 350 is repositioned. The change in the torso angle is a result of the displacement of the front face 312 of the seat back 310, such as displacement from a first position designated by dashed line i to a second position designated by dashed line k. In accordance with the present invention, as the head restraint 350 is lowered from a raised position shown by dashed line h, to a lowered position shown by dashed line j; the front face 312 of the seat back 310 is displaced outward from the first inward position i, to the second outward position k. Thus, the change in position of the head restraint 350 results in a change in orientation of the torso plane x (FIG. 1). Specifically, as the head restraint 350 is lowered from a raised position shown by dashed line h, to a lowered position shown by dashed line j; the torso plane $x_1$ is re-oriented to a new torso plane $X_2$ as shown in FIG. 12. As the torso angle is taken with respect to a vertical plane, such as y in FIG. 12, it will be appreciated that for the head restraint position h, a corresponding torso angle C is defined. And, for the head restraint position j, a corresponding torso angle B is defined. Comparing these two angles, it can be seen that for this preferred embodiment, as the head restraint 350 is lowered, the torso angle decreases, i.e. becomes smaller.

The preferred embodiment depicted in FIGS. 4 and 5 exhibits an opposite action from that of the embodiment of FIGS. 6 and 7, such that as the head restraint 250 is lowered, the torso angle increases, i.e. becomes larger. The preferred embodiment depicted in FIGS. 8 and 9 exhibits a characteristic such that as the head restraint is moved from a forward position to a rearward position, the torso angle increases. The present invention includes an opposite action such that as the head restraint is moved from a forward position to a rearward position, the torso angle decreases. The preferred embodiment depicted in FIGS. 10 and 11 exhibits a characteristic such that as the head restraint is pivoted from a forward position to a rearward position, the torso angle increases. The present invention includes an opposite action such that as the head restraint is pivoted from a forward position to a rearward position, the torso angle decreases.

In addition, the present invention also includes seat and head restraint assemblies in which the head restraint is displaced in a combination of directions. For instance, for a seat assembly in which a corresponding head restraint is lowered and moved rearwardly, a change in contour of the seat back could be determined by summing or otherwise netting the individual seat back movements associated with each motion component, i.e. the vertical component and the horizontal component.

Nearly any type of mechanism or actuator can be used to impart movement of the front face of the seat back, i.e. to change the contour of the seat back. For example, mechanical assemblies can be used to displace or otherwise selectively position one or more members within the seat back that cause the front face of the seat back to be urged outwardly or to be retracted inwardly, as the position of the head restraint is changed. It is also contemplated that one or more electrical motors, such as direct current servo motors could be used to selectively position one or more members within the seat back, as the position of the head restraint is changed. In addition, it is envisioned that one or more inflatable bladders could be provided within the seat back, which are selectively inflated or deflated depending upon the movement of the head restraint. The actual mechanism for displacing the seat back can be located within the seat back itself. The mechanism can be actuated and/or controlled in a variety of different ways such as mechanically by head restraint rods or supports, or electronically using a microprocessor.

An adjusting system is operably associated with the seat back 110 and head restraint 150. As shown in FIG. 1, the adjusting system can include an adjusting mechanism or actuator 160. Nearly any type of mechanism or actuator can be used to impart movement of the front face of the seat back, i.e. to change the contour of the seat back. For example, mechanical assemblies can be used to displace or otherwise selectively position one or more members within the seat back that cause the front face of the seat back to be urged outwardly or to be retracted inwardly, as the position of the head restraint is changed. It is also contemplated that one or more electrical motors, such as direct current servo motors could be used as the adjusting mechanism 160 to selectively position one or more members within the seat back, as the position of the head restraint is changed. In addition, it is envisioned that the adjusting mechanism 160 can include one or more inflatable bladders provided within the seat back, which are selectively inflated or deflated depending upon the movement of the head restraint. The actual mechanism for displacing the seat back can be located within the seat back itself. The adjusting mechanism 160 can be actuated and/or controlled in a variety of different ways such as mechanically by head restraint rods or supports, or electronically using a microprocessor.

In accordance with the present invention, and as depicted in FIG. 1, it is also contemplated that the adjusting system can include one or more sensors 162 in the head restraint 150 or support assembly for the head restraint that sense or otherwise determine the relative position of the head restraint 150 to that of the seat back 110. The use of such sensors 162 enables a vehicle seat positioning control system (not shown) to adjust the contour of a seat back via the adjusting mechanism 160 as described herein depending upon the position or change in position of the head restraint.

It will be understood that any and all features of one embodiment may be combined or otherwise utilized with any and all features of other embodiment(s) described herein.

Many other benefits will no doubt become apparent from future application and development of this technology.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A vehicle seat assembly comprising:
   a seat;
   a seat back positionably secured to the seat, the seat back having an upper face and a seat face, the seat face defining a contour adapted to contact and support the back of a person sitting in the seat assembly;
   a head restraint separate from and positionably secured to the seat back via a generally vertically oriented support member, wherein the head restraint is positionable between a raised position and a lowered position relative to the upper face of the seat back and is positionable between a forward position and a rearward position relative to the upper face of the seat back; and
   an adjusting system operably associated with the seat back and the head restraint, wherein while maintaining the same upright orientation of the seat back relative to the seat, the adjusting system is configured such that upon a change in the height position of the head restraint relative to the upper face of the seat back and upon a change in the forward or rearward position of the head restraint relative to the upper face of the seat back, the contour of the seat face of the seat back changes.

2. The vehicle seat assembly of claim 1 wherein the contour of the seat face of the seat back is positionable between an outwardly extended position and an inwardly retracted position.

3. The vehicle seat assembly of claim 2 wherein upon lowering the head restraint, the contour of the seat face of the seat back is extended outward.

4. The vehicle seat assembly of claim 2 wherein upon raising the head restraint, the contour of the seat face of the seat back is retracted inward.

5. The vehicle seat assembly of claim 1 wherein the head restraint can be positioned to a head restraint height of at least 750 mm.

6. The vehicle seat assembly of claim 5 wherein the head restraint can be positioned to a head restraint height of at least 800 mm.

7. The vehicle seat assembly of claim 1 wherein the contour of the seat face of the seat back is positionable between an outwardly extended position and an inwardly retracted position, and upon forwardly or rearwardly positioning the head restraint, the contour of the seat face of the seat back is extended outward.

8. A vehicle seat assembly comprising:
   a seat;
   a seat back positionably secured to the seat, the seat back defining an upper face and a seat face, the seat face adapted to contact and support the back of a person sitting in the seat assembly;
   a head restraint separate from and positionably secured to the seat back via a generally vertically oriented support member; and
   an adjusting system operably associated with the seat back and the head restraint, wherein upon first changing the height of the head restraint relative to the upper face of the seat back, a contour of the seat face of the seat back then changes via the adjusting system.

9. The vehicle seat assembly of claim 8 wherein the head restraint is positionable between a raised position and a lowered position.

10. The vehicle seat assembly of claim 9 wherein the contour of the seat face of the seat back is positionable between an outwardly extended position and an inwardly retracted position.

11. The vehicle seat assembly of claim 10 wherein upon lowering the head restraint, the contour of the seat face of the seat back is extended outward.

12. The vehicle seat assembly of claim 10 wherein upon raising the head restraint, the contour of the seat face of the seat back is retracted inward.

13. The vehicle seat assembly of claim 9 wherein the head restraint can be positioned to a head restraint height of at least 750 mm.

14. The vehicle seat assembly of claim 13 wherein the head restraint can be positioned to a head restraint height of at least 800 mm.

15. A vehicle seat assembly comprising:
- a seat adapted to contact and support an occupant sitting in the seat assembly;
- a hinge component affixed to the seat;
- a seat back pivotally secured to the seat by the hinge component, the seat back including an upper face and a forwardly directed seat face adapted for contacting and supporting the back of the seat occupant, the seat face being displaceable between an outwardly extended position and an inwardly retracted position; and
- a selectively positionable separate head restraint secured to the seat back via a generally vertically oriented support member, the head restraint being positionable between a raised position and a lowered position relative to the upper face of the seat back and is positionable between a forward position and a rearward position relative to the upper face of the seat back; and
- an adjusting system operably associated with the seat back and the head restraint, wherein upon the head restraint being first repositioned relative to the upper face of the seat back, the seat face is then displaced via the adjusting system.

16. The vehicle seat assembly of claim 15 wherein upon repositioning of the head restraint to a new position lower than a previous position, the seat face is displaced to a new position different than a previous position.

17. The vehicle seat assembly of claim 15 wherein upon repositioning of the head restraint to a new position higher than a previous position, the seat face is displaced to a new position different than a previous position.

18. The vehicle seat assembly of claim 15 wherein the head restraint is positionable to a head restraint height of at least 750 mm.

* * * * *